June 25. 1929.  L. J. SIMONS  1,718,387
SYNCHRONIZING APPARATUS
Filed March 19, 1923   5 Sheets-Sheet 4

Inventor
Louis J. Simons
By his Attorneys
Schechter Hotch

June 25, 1929.  L. J. SIMONS  1,718,387
SYNCHRONIZING APPARATUS
Filed March 19, 1923  5 Sheets-Sheet 5

Patented June 25, 1929.

1,718,387

UNITED STATES PATENT OFFICE.

LOUIS J. SIMONS, OF NEW YORK, N. Y., ASSIGNOR TO GENERAL SYNCHRONIZING CORPORATION, A CORPORATION OF NEW YORK.

SYNCHRONIZING APPARATUS.

Application filed March 19, 1923. Serial No. 625,996.

My invention relates generically to mechanism for synchronizing the operations of moving parts, and in this application I have adapted my invention to synchronizing moving pictures by means of a projecting machine or motion picture machine and a sound producing instrument.

One of the objects of my invention is the combination and association of a motion picture machine employing a film and a second machine, and means for synchronizing the second machine with the film.

Another object of my invention is to provide means for a direct and positive control of the circuits from or with the film or its actuating mechanism to the sound producing machine.

Another object of my invention is to provide means for identifying a predetermined portion of the film of the motion picture machine and the corresponding portion of the player roller of the sound producing mechanism.

Another object of my invention is the combination and association of a sound producing instrument operated by successive steps and a motion picture machine employing a film operated by successive steps, and means for synchronizing the steps.

Another object of my invention is the combination and association of two machines adapted to be synchronized and means actuated by one of said machines for rendering the synchronizing means effective.

My invention broadly relates to synchronizing mechanisms adapted to synchronize a plurality of operating mechanisms. While such mechanism may be of a widely divergent character, the invention is particularly designed for the synchronization of a motion picture apparatus or other device capable of producing animated or moving pictures and a musical or other sound producing instrument, as a player piano, organ, phonograph or other device, for example, or the synchronization of two musical instruments, such as a player piano and a phonograph or a player piano and an organ, etc.

In this application I have selected to illustrate one form of a practical embodiment of my invention, a motion picture apparatus in synchronism with a musical or sound producing instrument employing a traveling perforated note sheet, or other device constituting the record or roll. I desire it understood, that this particular application of my invention is merely illustrative and exemplary, and that the invention is not restricted in its application to such devices, but is capable of a wide variety of uses, and is adapted to any style of machine, apparatus or instrument which is to be synchronized.

The idea of synchronizing two or more operating instruments and of the synchronization of a plurality of musical instruments is old in the art, and scores of patents have been granted thereon. Moreover, the desirability of synchronizing a motion picture machine with some form of musical or sound producing instrument has been apparent from the very earliest days of the motion picture art, and I am further aware that in this last field, also, a great deal has been done and many patents have ben issued with this idea in view. Nevertheless, it is well known that there does not exist today a single successful synchronizing device adapted to produce talking or musical sounds in synchronism with the motion picture. Where the desirability of such a device is so great and so obvious, it must be apparent that if there existed a single device which accomplishes the results, such device would have been employed long ago.

An examination of the art will readily reveal the causes of the failure of the prior mechanisms. The main reason for the failure of these devices is due to the fact that although mechanism was provided for synchronizing some part of the motion picture machine with the musical instrument, such synchronization was lost somewhere between the said part of the motion picture machine and the film.

Thus, in practically every case, the synchronizing mechanism has been attached to the shaft of the motor which drives the motion picture mechanism. In effect, therefore, the motor shaft, rather than the film, was synchronized with the musical instrument. It was found, therefore, that while the motor shaft may have been in synchronism with the musical instrument, the individual frames of the film were not in synchronism. This can be readily understood when one examines the structure of a motion picture machine. It will be found that such machine usually employs a motor, the shaft of which is connected by a plurality of belts and pulleys and a very complicated train of gears with the film. Obviously, therefore, a great amount of slippage, lost motion, back lash, etc., will take place between the motor shaft and the film. So that while the motor shaft may or may not be in synchronism with the musical instrument, it is certainly the case that the film will be completely out of synchronism with said instrument. It was also true that no correction could be made for these errors in order to secure synchronization because these factors are not constant but vary continuously.

I have overcome all the objections to the synchronization of a motion picture machine with a musical instrument, as hereinbefore set forth, by a simple and extremely effective expedient, which consists in synchronizing the frames of the film proper or some part of the machine equivalent to and necessarily in exact synchronism with the frames with the musical instrument so that no errors can occur. I accomplish this most desirable result by the simple expedient of synchronizing the shutter shaft, or the shaft of the intermittent gear, or one of the machine elements necessarily tied up with the film frames in the same manner as said shaft or gear, rather than the motor shaft. At this point it must be remembered that the shutter is in absolutely exact synchronism with the frames of the film, for if the shutter were even the slightest amount out of synchronism with the frames, it would be at once apparent in the projection of the pictures because streaks would mar the picture. It is for this reason, therefore, that motion picture machines are provided with an adjustment whereby the shutter may be synchronized with absolute exactness with the frames of the film, so that one revolution of the shutter will mean the passage of exactly one frame of the film. Similarly, the intermittent gear is absolutely and exactly tied up with the frames of the film, since each time the intermittent gear is actuated the film is moved exactly the distance of one frame. If this is not the case, the dividing line of the frames appears on the screen during projection and the operator at once makes the necessary adjustment. When, therefore, I tie up my synchronizing mechanism with the shutter shaft or the shaft of the intermittent gear, or some other moving member whose motion is necessarily tied up absolutely and exactly with the frames of the film and always kept in synchronism therewith, I tie up each and every individual frame of the film with the musical instrument. There can, therefore, be no lost motion, no back lash of gears, no slippage of belts or pulleys, which would result in totally destroying synchronization. It must be remembered that the synchronization of pictures with sound producing mechanism is a thing of the greatest delicacy wherein even slight discrepancies or errors will result in destroying the synchronization. It is apparent to any observer that a sound and an action must occur simultaneously, otherwise, the effect is completely lost and sometimes even results in a ludicrous situation. The importance of my elimination of all the factors which hitherto have destroyed synchronization at the motion picture machine will, therefore, be readily apparent.

Examining the prior art again for further causes of failure to obtain the perfect synchronization which successful operation demands, we find that in addition to the substantial errors in synchronization at the motion picture machine, there were errors also at the musical instrument. This is especially the case in those instruments, such as player pianos, organs and the like, which are controlled by a perforated rolls operated by a motor. In order to secure synchronization with the motion picture machine, the speed of the motor was increased or decreased correspondingly. It should be borne in mind that from the motor to the player roll there is interposed considerable mechanism and that slowing down or speeding up of the motor would first have to act through said mechanism before reaching the roll. As a result of this there was always some lag, always some lost motion, so that the operation of the player roll, which should have been quickened or slowed up to correspond with a given portion of film, did not respond, but that actually some portion before or after the desired portion responded to the different speed. Moreover, even though a motor operates at a constant speed, it is apparent that slight variations will occur so that equal increments of the player roll will not be advanced during equal increments of running time. These and other errors would have served to destroy synchronism at the musical instrument even if there had been no errors which would destroy synchronism at the motion picture machine.

To obviate the difficulties set forth in the preceding paragraph, I again employ a very simple but extremely efficient expedient. I drive the music roll through a motor which always has a surplus of power thereon so that if the motor were unrestrained the roll would be advanced at a much more rapid rate than desired. I then control the operation of the roll by means of a step-by-step escapement. It will be obvious that each step of the escapement is exactly similar to every other step so that each actuation of the escapement, the roll will be advanced through exactly the same distance. If now I tie up the escapement with the frames of the film, or with an equivalent of said frames such as the intermittent gear or the shutter shaft, so that the escapement is operated in accordance with the speed of said frames or their equivalent, it will be obvious that each and every frame of the film will be tied up absolutely with a portion of the roll equal to that advanced by one step of the escapement. That is to say, every time the film is advanced one frame, or the intermittent gear is actuated through one step, or the shutter shaft makes a revolution or portion of a revolution, or some other element equivalent to the aforementioned is actuated to a predetermined degree, exactly one frame of the film will be brought to operative position, as we have heretofore seen, and since the said shutter shaft, intermittent gear or other equivalent element is tied up to actuate the escapement, the roll will be advanced one step each time the shutter, intermittent gear or other equivalent element is actuated through a predetermined degree.

I have succeeded where all my predecessors have failed in that I have recognized the delicacy of the synchronizing operation and eliminated all possible sources of error occurring at the motion picture machine and at the musical instrument. In addition to accomplishing this most desired result successfully, I employ a device of the utmost simplicity, inexpensiveness and ease of manufacture which can be readily applied to any known motion picture machine and musical instrument without involving serious or costly changes therein.

A further step in my invention consists in tying up each individual frame of the film with a definite, predetermined section of the player-roll. We have seen that structurally I tie up each frame of the film with one step of the escapement, and hence one section of the roll. It is a further object of my invention to so synchronize the devices that each frame will always be tied up with the same section of the roll, so that the same sounds will always accompany the respective frames of the film. To accomplish this result the following factors are necessary: First, the film and the roll must always have the same relative starting positions. Second, they must be exactly synchronized throughout their movement. Third, should any corrections or cutouts be made in the film it must be possible to locate and similarly correct or cut out the corresponding sections of the roll. To meet the first of these requirements, I provide means permitting the roll to be operated to starting position before the synchronizing mechanism becomes effective and provide means whereby the passage of the film controls the setting in operation of the roll. By this means it is assured that the roll will be set in motion in predetermined, exact relationship to the film. The second of the requirements is, of course, met by the synchronizing mechanism hereinbefore described. The third requirement is met by numbering or otherwise marking the frames of the film and placing corresponding numerals or other marks upon the sections of the roll corresponding to said frames. So that if certain frames are cut out, the corresponding music can be eliminated by cutting out those sections of the roll having the same numbers or markings as the said frames.

It is a further object of this invention to provide an escapement mechanism which is certain in its operation and which is constructed so as to obviate all danger of sticking or slipping. This is of great importance, for, in a device where the parts are all so delicately synchronized and adjusted to each other, inefficient operation of the escapement could result eventually in destroying the synchronism.

Other objects and advantages will appear as the nature of the improvements is better understood, the invention consisting substantially in the novel arrangement and corelation of instrumentalities herein fully described, and illustrated in the accompanying drawings, wherein similar reference characters are used to described corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than restrictive, standpoint.

The inventive idea involved is capable of receiving a variety of mechanical expressions, some of which, for the purposes of illustration, are shown in the accompanying drawings; in which—

Figure 1:
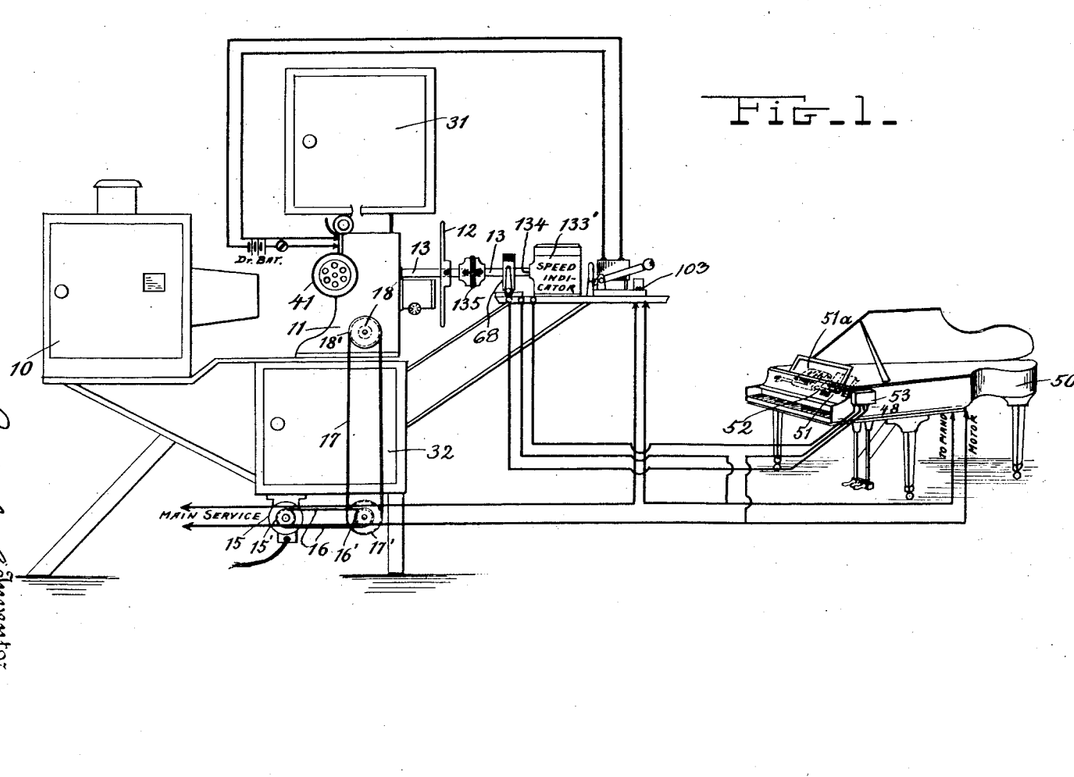
Fig. 1 is an assembled view, largely diagrammatic, showing the method of applying my invention to the synchronization of a motion picture machine and a player piano.
Figures 4, 5, 6:
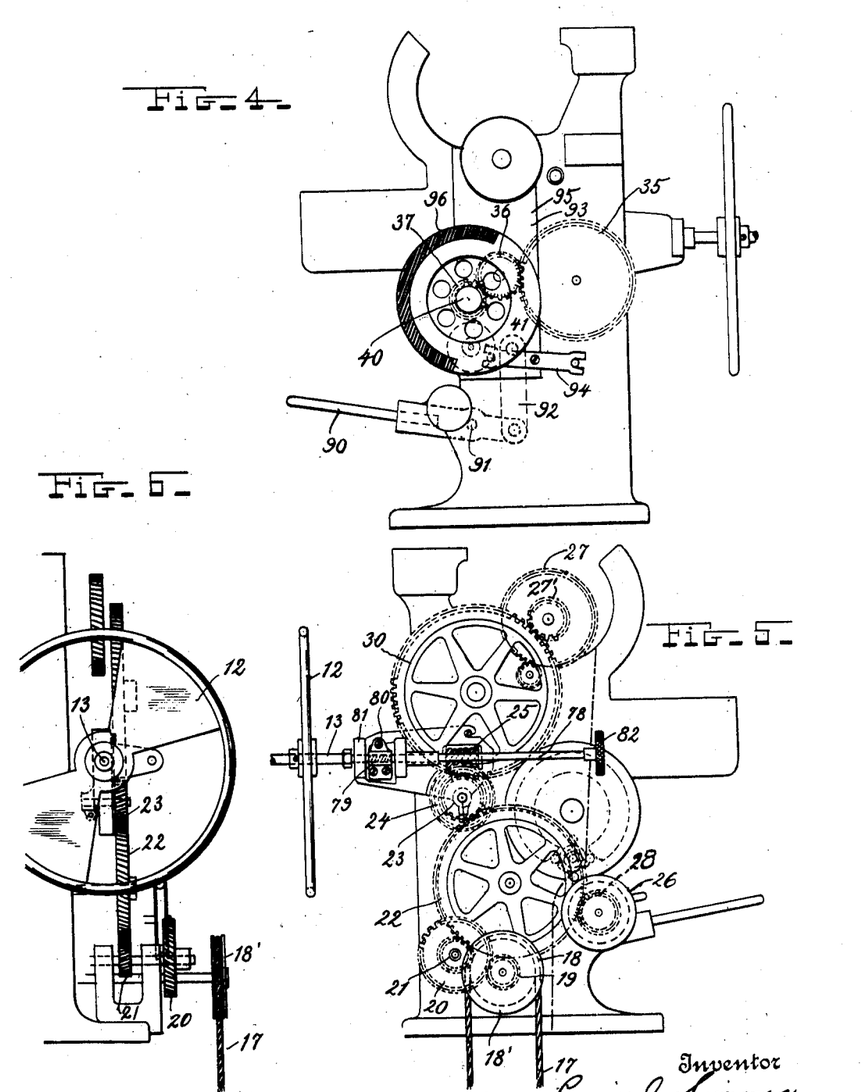
Fig. 4 is a side elevation of the head of a motion picture machine, showing the adjusting means for framing the film.
Fig. 5 is an elevation of the other side of the motion picture head, showing the shutter adjusting mechanism.
Fig. 6 is a front elevation of the device shown in Fig. 5.

Referring to the drawings, there is shown in Fig. 1 a motion picture machine which comprises a lantern 10 adapted to project light through a head 11, in front of which operates a shutter 12 mounted on a shaft 13. The mechanism supported by the head, as well as the shutter and its shaft, are driven from the driving mechanism beneath the head 11, which mechanism may comprise a motor 15, on the shaft of which is fixed a pulley 15', over which operates a belt 16, which operates over a pulley 16' at its other end. On the same shaft with pulley 16', is a pulley 17', over which operates a belt 17, which passes over a pulley 18' within the head 11. On the same shaft with pulley 18' is a gear 18, which operates a train of gearing for driving the usual mechanism of a motion picture machine, such as the shutter, the intermittent gear, etc. Referring to Fig. 5, there is shown one usual form of gearing for driving the shutter. The train of gearing comprises a gear 18 carrying upon the same shaft therewith gear 19, which meshes with gear 20, which carries upon the same shaft therewith gear 21. Said gear 21 engages a gear 22, which meshes with a gear 23 carrying upon the same shaft therewith a spiral gear 24 which meshes with a worm 25 on the shutter shaft 13. From the gear 22, the feed sprockets 26 and 27 for the film may be driven through gear 28 for the lower sprocket, and gears 23 and 30 and 27' for the upper sprocket. The sprockets drive the film from the upper supply reel contained in box 31 to the lower takeup reel contained in box 32. The shaft of gear 23 extends through the head to the other side thereof where it carries a gear 35 driving a gear train 36, 37, said gear 37 being mounted on shaft 40, which carries one member of the intermittent gear, such as shaft 40 also carrying a fly wheel 41 at one end thereof.

The above description of the structure of a motion picture machine, as well as such further description as may be set forth hereinafter, refers to the Powers type of machine, but it is to be understood that this is for the purposes of illustration and description only, and that any other standard type of machine may be similarly employed. For further details of such machine, reference may be had to U. S. Patents No. 1,184,126, granted May 23, 1916 and No. 1,129,121, granted February 23, 1915.

According to my invention, I synchronize the motion picture machine with a musical or other sound producing instrument which, for the purposes of illustration, I have shown as a player piano 50, adapted to be driven by motor 51 and which may be of the type employing a perforated roll. In operation, the motor 51 always places a surplus of power upon its driving shaft 52, so that if said shaft were under strain, it would normally drive the piano at an excessively rapid rate. To control the speed of said motor and hence the operation of the piano, I provide a speed control mechanism 53, which may be in the form of a casing, mounted as shown in Fig. 1, upon the piano, so that the shaft of the motor extends therethrough. The device is shown in detail in Fig. 3, wherein the outer casing has been removed for the purpose of clearly showing the structure contained therein, and comprises a ratchet wheel 55, fixed upon the motor shaft 52. With said ratchet wheel cooperates a bifurcated member 56, pivoted on a bracket 49 at 57 and having arms 58, 59, carrying near their lower extremities pins 60 and 61 adapted to engage the ratchet wheel 55. The arms diverge, so that only one of the pins can engage the ratchet at any given time. The motor shaft tends normally to rotate the ratchet wheel in the direction of the arrow, so that each time pin 60 moves out of engagement with the wheel, the latter will be rotated by the motor. By any movement of pin 60 outwardly, pin 61 is moved into engagement with the wheel to permit the latter to move through only one tooth space. The device is, therefore, essentially an escapement mechanism. It will be observed from the drawing that the arms 58 and 59 are of different lengths. The arm 58 is considered as terminating at pin 60 and extending down to a point opposite the axis of the wheel, while arm 59 is of such length that pin 61 terminates some distance above the diameter drawn through the wheel to the point of engagement of pin 60. By this construction, it will be observed that pin 61, not being opposite the dead center of the wheel, can readily be cammed outwardly by the descending tooth of the ratchet with which it is in engagement. Thus, pin 61 will normally be cammed outwardly a short distance so that the arm 59 need be rocked only a very small amount to cause pin 61 to release the ratchet. This construction prevents sticking of the speed control mechanism; that is, failure to respond and operate the musical instrument and thus cause loss of synchronization between the instrument and the motion picture machine, as will become more fully apparent as the description proceeds. The member 56 comprises also a rocker bar 62, supporting at its outer ends bars 63 and 64 of magnetic material, extending into solenoids or electro-magnets 65 and 66.

Figure 3:
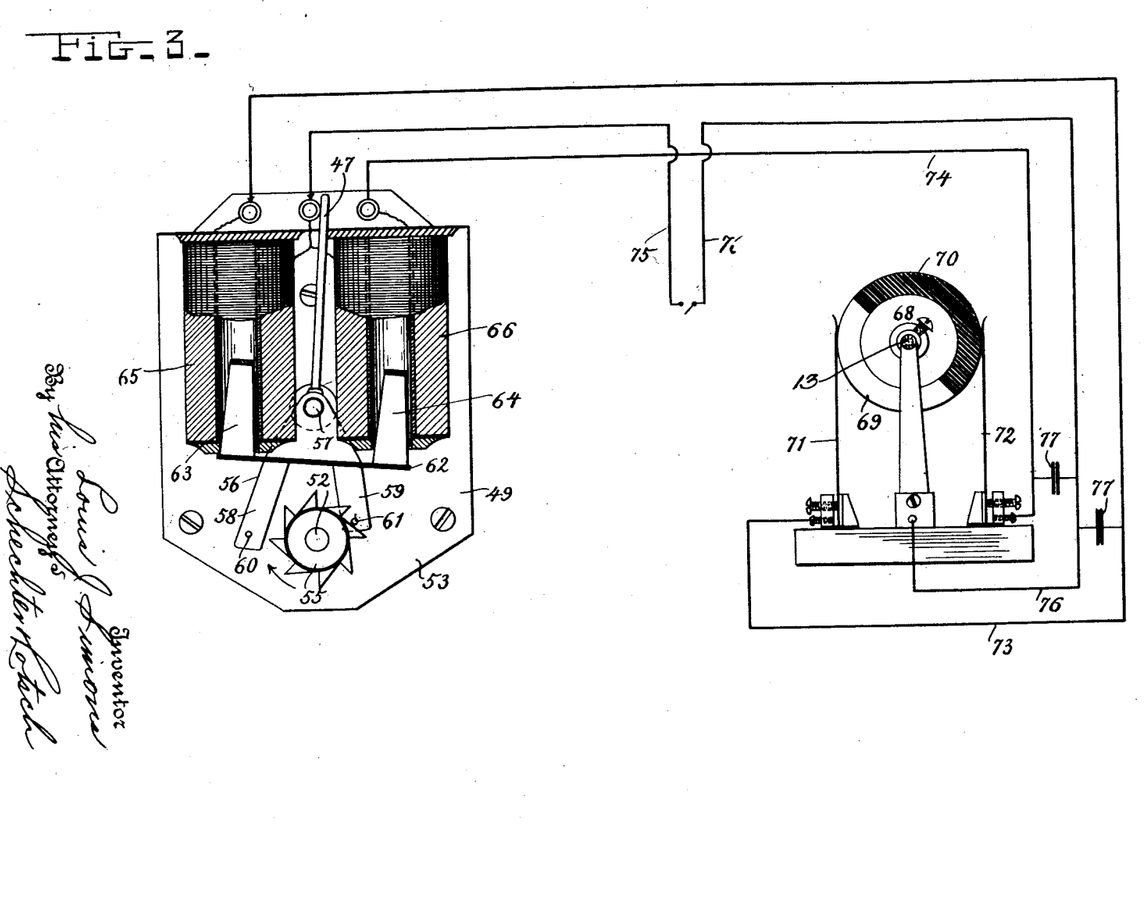
Fig. 3 is a view showing the speed regulating mechanism, partly in section vertically, the controlling mechanism therefor, and the wiring between the mechanisms.

It will be apparent that if electro-magnets 65 and 66 are alternately energized, the escapement will be operated to permit step-by-step operation of the motor shaft 52, and hence of the sound producing instrument. To energize magnets 65 and 66 alternately, there may be provided a commutator 68 having a conducting portion 69 and an insulating portion 70. A pair of brushes 71, 72 cooperate with said commutator at opposite ends of a diameter, one of said brushes being in circuit with magnet 65 through lead 73, and the other of said brushes being in circuit with magnet 66 through lead 74. A common return 75 may be provided and also a common supply lead 76, in which may be placed condensers 77 to provide a more even supply of current to the magnets and to reduce the arc at the commutator. The insulator portion 70 is somewhat greater than one half the circumference of the commutator, so that there could be no dead spot where both brushes engage the conductor portion 69 at the same time and thus cause actuation of both magnets. The speed control mechanism, as shown in Fig. 1, when enclosed in its casing and mounted upon the musical instrument, has on the outside thereof, only the binding posts 48 and a stem 47 fixed to the rocker 62 of the escapement to permit hand operation of the escapement for a purpose to be described hereinafter.

Obviously, therefore, every time the commutator makes a complete revolution, both magnets will have been energized to permit the escapement to operate one tooth space. According to the present invention, I desire to synchronize the movements of the motion picture film with the movements of the musical instrument, which is, in this case, a player piano. For this purpose I make provision for operating the music record, in this case the piano roll, through a predetermined extent for every frame of the film. The importance of operating the musical instrument through exactly the same extent for each frame has been set forth in the introduction to this specification. By the mechanism hereinbefore described, it is apparent that the music roll will be advanced exactly an equal distance every time the escapement is actuated, since the distances between the teeth of the ratchet are in every case exactly equal. It now remains to provide a mechanism which will ensure operation of the escapement every time a frame is moved into effective position. The importance of tying up the commutator with the frames of the film so that exactly one revolution of the commutator is completed for each frame of the film has also been made evident and described heretofore, where it was shown that this is one of the principal factors making for the success of the synchronizing device. It will be understood that one revolution of the commutator may correspond to a plurality of complete frames of the film, but that in any case one actuation of the escapement must correspond to the movement of exactly one frame of the film. To obtain actuation of the escapement exactly once for each frame of the film, it is necessary operatively to connect the escapement with the frames or else with some part of the motion picture machine which necessarily is absolutely synchronized with the frames. As hereinbefore noted, in order to obtain absolute synchronization between the frames of the film and the escapement mechanism, it is necessary to mount the circuit closing device, that is, the commutator, upon some part of the motion picture machine, which necessarily is absolutely synchronized with the frames, that is, there are certain parts of the motion picture machine which must be in synchronism with the frames of the film, or else operation is difficult, inefficient and renders the picture obscure in the projection thereof, so that the operator has to make necessary adjustments to keep these parts always in synchronism with the frames. By mounting the commutator upon such parts, exactly the same result is obtained as if the escapement is controlled from the frames of the films themselves. Examining the structure of the motion picture machine, we find that the following elements are among those so bound up with the movements of the frames that they are absolutely and necessarily synchronized therewith:

*The shutter shaft.*—Obviously the shutter must be exactly timed with the movement of the film, for if it is not, it will obliterate parts of the picture and show it in the form of black or white streaks on the screen. For this purpose, there is provided an adjustment whereby the shutter may be moved ahead or behind to obtain exact synchronism with the frame. Such an adjustment mechanism is shown in Fig. 5, and comprises an operating stem 78 having a threaded portion 79, upon which is threaded a carriage 80, said carriage engaging a bracket 81, in which the shutter shaft 13 is supported, so that rotation of stem 78 by knob 82 thereof will operate shaft 13 forwardly or rearwardly across spiral gear 24 to advance or retard the shutter. For a fuller and more complete description of this adjustment, reference may be had to United States Patent 1,184,126, hereinbefore mentioned.

Figure 7:
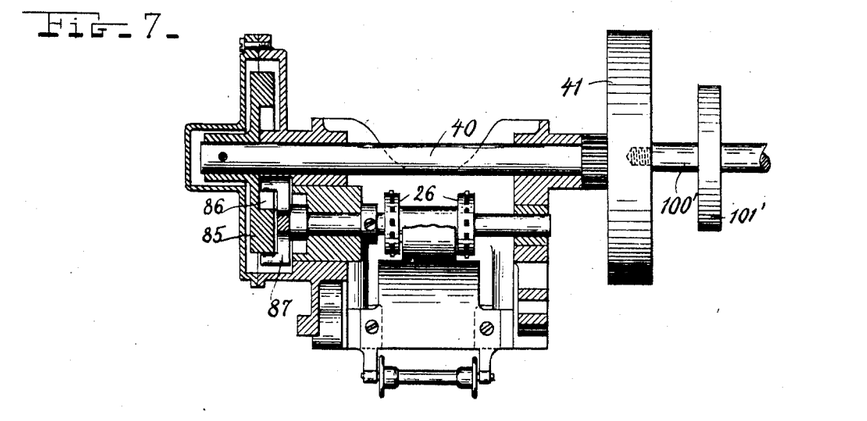
Fig. 7 is a horizontal section, through the intermittent movement of the motion picture machine, showing the relation of the driving shaft and the driven shaft carrying the feed sprocket.
Figure 8:
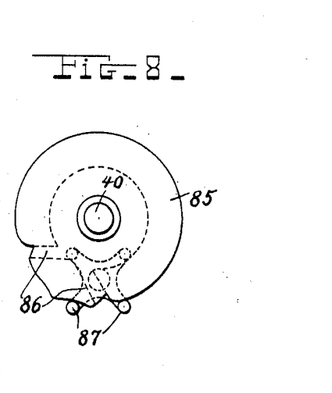
Fig. 8 is a detail view showing certain parts of the intermittent movement shown in Fig. 7.

*The intermittent gear.*—This is the gear which moves the film one frame at a time to operative position. Obviously, absolute synchronism must exist between this gear and the frames of the film, for if there were the slightest amount of lost motion, slippage or similar error, the film would not be properly framed, a condition which is immediately apparent because there is projected on the screen part of one frame of the film and part of the adjacent frame, instead of all of one frame. That is, the dividing line between the frames will appear on the screen. For this purpose, there are provided means on the motion picture machine for "framing" the film, that is, bringing the intermediate gear into exact synchronism with the frames of the film. The intermediate gear comprises two members, one of which is a cam 85, mounted on one end of shaft 40 which carries the fly wheel 41 at its other end. Engaging in the slots 86 of said came is a star wheel having pins 87, said star wheel being fixed to the end of the shaft carrying the lower sprocket 26. With each revolution of cam 85, the star wheel is rotated one step, that is, one fourth of a revolution. Should the intermittent gear lose exact synchronism with the frames of the film, the latter may be framed by the adjusting mechanism, which comprises an adjusting handle 90, pivoted at 91 and operating a link 92, connected to a slidable frame 93 in which the lower sprocket, intermittent gear shaft 40 and the star wheel shaft are mounted. The movement of the slidable frame 93 is guided by links 94. By raising or lowering frame 93, the frames of the film are raised or lowered until they are properly framed in the aperture provided in the machine for this purpose. It is thus apparent that the intermittent gear is necessarily always in synchronism with the movements of the frames, since any loss of synchronism is at once apparent and adjustment can be made therefor. For a more complete description of the intermittent gear and its operation, as well as the adjustment for synchronizing the gear with the individual frames of the film, reference should be had to the United States Patent No. 1,184,126, before mentioned. It will be obvious then that either part of the intermittent gear may be tied up with the sound producing instrument and it will be the same as tying the instrument up with the frames of the film proper so that the commutator 68 may be mounted upon the shaft 40 or upon the fly wheel 41 on said shaft or upon the shaft of sprocket 26 with the certainty that the operation of these shafts will be absolutely synchronized with the movements of the film frames. If the commutator is mounted upon the shaft of sprocket 26, it would have to be provided with a plurality of live and dead portions so as to actuate the escapement four times for each revolution of the commutator. To mount the commutator on the fly-wheel shaft 40, said shaft may be extended by threading the end thereof internally and screwing into it a rod 100', upon which the commutator 101' is mounted. Or the fly-wheel itself may be utilized as a commutator by forming its periphery into a conducting portion 95 and an insulating portion 96. The latter may be a strip of insulating material embedded in a recess or groove formed in the periphery.

In any of the foregoing instances, the same principle holds good, that is, I utilize the frames of the film or some part which is equivalent to said frames because it is necessarily in absolute synchronism therewith. These structures must necessarily be tied up with the frames, or else operation is soon rendered visibly defective.

By any of the above means, it is assured that the commutator will be operated in exact synchronism with the individual frames of the film and hence the escapement will be operated in exact synchronism with the individual frames, so that the music record, in this case the perforated roll, is advanced exactly equal increments for each frame and in absolute synchronism therewith. Since once the synchronizing mechanism is set in operation, each frame is tied up with a definite portion of the music roll, it is important that means be provided whereby each frame of the film may always be tied up with exactly the same portion of the music roll, so that it will always be accompanied by the same sounds. For this purpose, the bifurcated member 56 is provided with the extension 47 whereby the member 56 may be rocked by hand to permit the motor 51 to operate the music roll until the proper starting point, which may be marked by a line 101 upon the music roll, comes in position over the tracker board of the piano. The circuit through the motor 51 is controlled by a switch 103 (see Fig. 2), which is normally open. Said switch is of the single blade type and comprises a blade 104, pivoted at 105 in a bracket 106, said blade being over-weighted at 107 so as to tend normally to swing the blade into engagement with the contacts 108 to close the circuit through the motor. The switch is held open by a trigger arrangement comprising a pawl 110, normally pressed by a spring 111 into engagement with the upper surface of blade 104 at the end thereof opposite weight 107 so as to hold it in elevated position. To ensure starting of the piano in exact synchronism with the first film frame which is to be accompanied by music, said film is notched at the side as at 115 at a predetermined portion thereof to permit actuation of the circuit closer to actuate an electro-magnet 117 mounted in bracket 106 and adapted to attract pawl member 110 against the action of spring 111 to permit blade 104 to drop into engagement with contacts 108.

Figure 2:
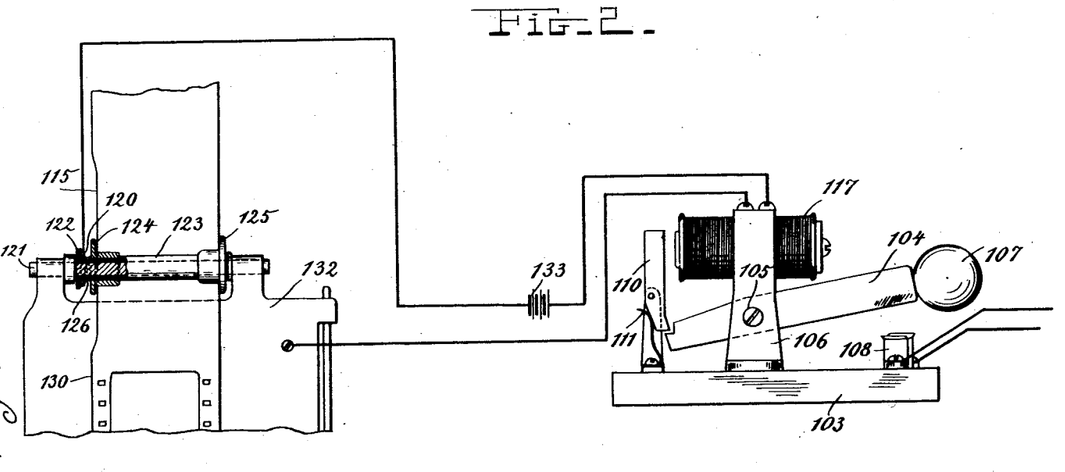
Fig. 2 is a view, largely diagrammatic, showing a film controlled circuit closer and a switch operated thereby.

The circuit closer actuated by the film comprises conducting washer 120 carried upon insulating bushing 122, mounted on roll shaft 121. A conducting sleeve 123 rotates loosely on shaft 121 and cooperates with guides 124, 125 at the sides of the film. The guide 124 is normally pressed against the edge of the film by a conducting spring 126. The current enters washer 120, and passes through spring 126 and bushing 124. When the ungrooved portion 130 of the film is in engagement with bushing 124, said bushing is out of engagement with sleeve 123, and the circuit is broken. When, however, the grooved portion 115 comes opposite bushing 124, the latter moves into engagement with the sleeve to close the circuit through electro-magnet 117 and to close the switch to start the musical instrument. The rest of the circuit extends from sleeve 123 to film gate 132, which is a conductor. The circuit-closing device may be energized by battery 133 or similar source of current.

Figure 9:
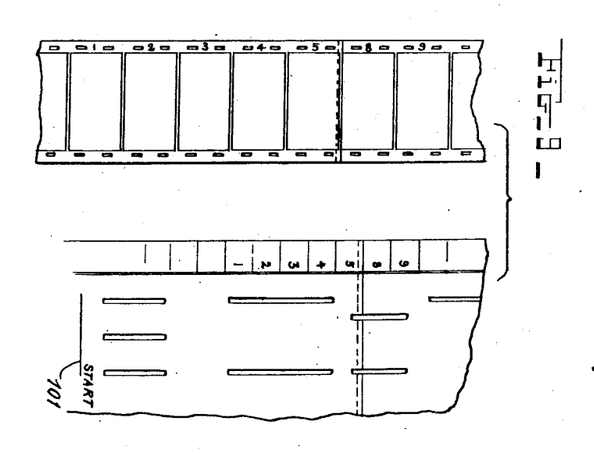
Fig. 9 is a view of a strip of motion picture film and a corresponding strip of music roll.

As each frame of the film is tied up with a definite portion of the roll, I prefer to number the frames of the film consecutively and number the portions of the roll similarly, so that at any given time a portion of the music roll corresponding to any portion of the film may be determined. Thus, if it is desired to cut out a portion of the film, or if a breakage occurs necessitating the destruction of several frames of the film, the corresponding portions of the music roll may also be cut out or otherwise eliminated. Thus, as shown in Fig. 9, frames 6 and 7 have been cut out and portions 6 and 7 of the music roll corresponding thereto have also been cut out.

While my invention has been described in connection with a player piano, it is to be understood that any other sound producing mechanism which employs a driving shaft may be utilized.

While I have illustrated the shaft 13 as provided with a universal joint 135 between the shutter and the commutator, I wish it distinctly understood that such universal joint may be eliminated and the shaft made of one piece with the shutter and the commutator similarly mounted. One end of the shaft 13 is connected to a speed indicator 133' in which it is journaled at 134. The speed indicator enables the operator to tell at a glance whether the instrument is running at the desired rate of speed.

In accordance with the provisions of the patent statutes, I have described the principle of my invention together with the apparatus which I now consider to represent a practical embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth, as it is obvious that the particular embodiments herein shown and described are only some of many that can be employed to attain these objects and accomplish these results.

Having described my invention, what I claim and desire to secure by Letters Patent is:—

1. In a device of the character described, a motion picture machine employing a film, a sound reproducing mechanism employing a roll, separate motive means for said machine and said mechanism, means for synchronizing the movement of said roll with the movement of said film and means for initiating movement of said roll, said means including an electric circuit, a switch in said electric circuit controlling the operation of said mechanism motive means, an electric circuit operating said switch, a circuit maker and breaker controlling said last mentioned circuit, said circuit maker and breaker being provided with an operating cam and a camming surface produced upon said film and in contact with said cam whereby movement of said film will initiate movement of said roll.

2. In a device of the character described, a motion picture machine comprising a film, a sound reproducing mechanism comprising a roll, separate motive means for said machine and said mechanism, means for synchronizing the movement of said mechanism with the movement of said film, and means for initiating movement of said roll, said means including an electric circuit and an electrically controlled switch in said circuit, said switch controlling the operation of said mechanism motive means and being itself controlled by a second electric circuit, and film actuated means for controlling said second circuit.

3. In a device of the character described, a motion picture machine comprising a film, a sound reproducing mechanism, separate motive means for said machine and said mechanism, means for synchronizing the movement of said mechanism with the movement of said film, and means for initiating movement of said mechanism, said means including an electric circuit, a switch in said circuit controlling the operation of said mechanism motive means, a second electric circuit operating said switch, a circuit maker and breaker controlling said last mentioned circuit and means located upon said film for operating said circuit maker and breaker.

This specification signed this 14th day of March, 1923.

LOUIS J. SIMONS.